(12) United States Patent
Schnaars et al.

(10) Patent No.: US 9,784,310 B2
(45) Date of Patent: Oct. 10, 2017

(54) METHOD FOR PRODUCING A BEARING, AND BEARING

(71) Applicants: Boge Elastmetall GmbH, Damme (DE); Audi AG, Ingolstadt (DE)

(72) Inventors: Wolfgang Schnaars, Osnabrueck (DE); Thomas Conrad, Treuchtlingen (DE)

(73) Assignees: BOGE ELASTMETALL GMBH, Damme (DE); AUDI AG, Ingolstadt (DE)

( * ) Notice: Subject to any disclaimer, the term of this patent is extended or adjusted under 35 U.S.C. 154(b) by 0 days.

(21) Appl. No.: 14/778,895

(22) PCT Filed: Feb. 19, 2014

(86) PCT No.: PCT/EP2014/053208
§ 371 (c)(1),
(2) Date: Sep. 21, 2015

(87) PCT Pub. No.: WO2014/146851
PCT Pub. Date: Sep. 25, 2014

(65) Prior Publication Data
US 2016/0047414 A1 Feb. 18, 2016

(30) Foreign Application Priority Data

Mar. 21, 2013 (DE) .......................... 10 2013 204 995

(51) Int. Cl.
*F16F 13/14* (2006.01)
*F16C 27/06* (2006.01)
(Continued)

(52) U.S. Cl.
CPC ............ *F16C 27/063* (2013.01); *F16C 33/20* (2013.01); *F16C 43/02* (2013.01); *F16F 1/3842* (2013.01); *F16F 13/1481* (2013.01)

(58) Field of Classification Search
CPC .... F16F 13/14; F16F 13/1445; F16F 13/1481; F16C 33/20; F16C 43/02
(Continued)

(56) References Cited

U.S. PATENT DOCUMENTS

| 5,123,634 A | 6/1992 | Schwerdt |
| 7,104,533 B2 * | 9/2006 | Kato ...................... F16F 1/3842 |
| | | 267/140.12 |

(Continued)

FOREIGN PATENT DOCUMENTS

| DE | 10162999 A1 | 6/2002 |
| DE | 10 2004 045669 A1 | 4/2006 |

(Continued)

OTHER PUBLICATIONS

International Search Report from co-pending PCT application No. PCT/EP2014/053208, issued Jun. 2, 2014.

*Primary Examiner* — Thomas J Williams
(74) *Attorney, Agent, or Firm* — Cohen & Hildebrand, PLLC (57) ABSTRACT

A method for producing a bearing, in particular a hydraulic axle support bearing, which comprises the following steps: preassembling an inner part in an outer part with an elastomer body which is arranged in between and is reinforced by a plastic cage which at least partially bears against an inner wall of the outer part. The plastic cage is configured to radially protrude over an upper edge and a lower edge of the out part and, at the lower edge of the outer part, to project over the latter. Simultaneously calibrating the outer part and the plastic cage by constricting the outer part and the plastic cage from a respective first diameter to a respective second diameter which is smaller than the respective first diameter.

(Continued)

After the constriction, the plastic cage projects over the upper edge of the outer part for the form-fitting axial securing of the outer part.

16 Claims, 8 Drawing Sheets

(51) Int. Cl.
  *F16F 1/38* (2006.01)
  *F16C 33/20* (2006.01)
  *F16C 43/02* (2006.01)

(58) Field of Classification Search
  USPC ............. 267/141, 141.2, 141.3, 141.4, 141.5
  See application file for complete search history.

(56) References Cited

U.S. PATENT DOCUMENTS

| | | | | |
|---|---|---|---|---|
| 8,087,648 | B2 * | 1/2012 | Auten | F16F 13/16 267/140.12 |
| 8,376,332 | B2 * | 2/2013 | Scharf | F16F 1/3821 267/141.2 |
| 9,422,999 | B2 * | 8/2016 | Hermann | F16F 13/1409 |
| 2005/0242480 | A1 * | 11/2005 | Nicholson | F16F 1/387 267/140.12 |
| 2006/0220286 | A1 * | 10/2006 | Borgerding | F16F 13/14 267/140.12 |
| 2006/0290040 | A1 | 12/2006 | If Friedrichshafen Ag | |
| 2010/0109213 | A1 * | 5/2010 | Schnaars | F16F 13/1481 267/140.12 |
| 2016/0084302 | A1 * | 3/2016 | Spinella | F16C 35/02 384/297 |

FOREIGN PATENT DOCUMENTS

| | | |
|---|---|---|
| DE | 102005029614 A1 | 1/2007 |
| DE | 10 2007 002 410 A1 | 11/2008 |
| DE | 102007034475 A1 | 1/2009 |
| EP | 0 388 520 A2 | 9/1990 |
| FR | 2 819 301 A1 | 7/2002 |
| JP | H108247206 A | 9/1996 |
| JP | 2000018312 A | 1/2000 |
| JP | 2000240715 A | 9/2000 |
| JP | 2001074080 A | 3/2001 |

* cited by examiner

METHOD FOR PRODUCING A BEARING, AND BEARING

CROSS-REFERENCE TO RELATED APPLICATIONS

This application is the U.S. national phase of application No. PCT/EP2014/053208, filed Feb. 19, 2014, which claims priority from German application No. DE10 2013 204 995.1, filed Mar. 21, 2013, the contents of which are incorporated herein in their entirety.

FIELD OF THE INVENTION

Background of the Invention

The invention relates to a method for producing a bearing, in particular a hydraulic axle support bearing according to the preamble of claim 1, as well as a bearing according to the preamble of claim 6.

The axle support bearings known in the prior art generally have an inner part made of aluminium, a radial channel, an outer part and an elastomeric region which is arranged between the inner part and the outer part. The elastomeric region is reinforced by a steel cage or a plastic cage which has the advantage of reducing the weight of the bearing substantially. A steel cage is embedded into the rubber of the elastomeric region, for example, and then completely surrounded by the rubber. In contrast, in the configurations known from the prior art, in which a weight-reducing plastic cage is used, only some areas of said cage are surrounded by the elastomeric region. A bearing configured as an elastomeric bush bearing is known from DE 10 2007 022 410 A1.

Axle support bearings configured as described above need to be calibrated however. This is relatively uncomplicated if steel cages are used and the bearing is calibrated prior to assembly. Further calibration is then performed after assembly which ensures both tightness and dimensional stability. During the latter calibration, several markings are pressed inwards at the periphery wherein the material of the outer part is pressed over the edge of the cage. This serves to connect the outer part to the inner part in the direction of extrusion in a form fit manner over the elastomeric region. However, as already stated, bearings with steel cages are very heavy.

If, on the other hand, the cage is made of plastic, calibration to apply increased compressive prestressing in the elastomeric region is difficult. However, this is necessary in terms of useful life, characteristic curve ratio and tight fitting of the plastic cage in the arrangement.

SUMMARY OF THE INVENTION

An object of the present invention is therefore to provide a method for producing a weight-reducing bearing with plastic cage, by means of which calibration can be performed in a simple and cost-effective manner. A bearing with reduced weight produced accordingly should also be provided.

This object is achieved through a method for producing a bearing having the features described herein.

A method for producing a bearing, in particular a hydraulic axle support bearing, is provided, wherein the method comprises the following steps: preassembling an inner part in an outer part with an elastomer body which is arranged in between and is reinforced by a plastic cage, which at least partially bears against an inner wall of the outer part, wherein the plastic cage is designed to protrude radially over an upper edge and a lower edge of the outer part and, at the lower edge of the outer part, to project beyond the latter; and simultaneously calibrating the outer part and the plastic cage by constricting the outer part and the plastic cage from a respective first diameter to a respective second diameter which is smaller than the respective first diameter, wherein, after the constriction, the plastic cage likewise projects over the upper edge of the outer part for the form-fitting axial securing of the outer part.

The method enables easy and thus cost-effective calibration of both the outer part and, at the same time, the plastic cage in a single method step. The outer part is connected to the plastic cage in a form fit manner in the end position which effects the required axial securing of the outer part. By way of an example, this also renders the markings and indentations on the outer part used in the prior art unnecessary.

Preferably, there is clearance, in particular of 2 mm, during the pre-assembly step. Moreover, it is preferred if the measurement of the constriction of the outer part from the first diameter to the second diameter is greater than the above mentioned clearance, more particularly that the constriction measures more than 3 mm, preferably approx. 4 mm.

Preferably, the outer part is simply slid onto the inner part with the elastomer body and the plastic cage from above in the pre-assembly step.

Furthermore, it is advantageous if the elastomer body is connected to the plastic cage in a vulcanisation step, wherein the plastic cage is inserted into a tool in a substantially form fit manner. This will prevent an undesirable deformation of the plastic cage during the vulcanisation process.

A bearing, more particularly a hydraulic axle support bearing, with an inner part, an outer part and an elastomer body which is arranged in between and is reinforced by a plastic cage, is also provided, wherein the outer part has an upper edge and a lower edge and wherein the plastic cage projects over the upper edge and the lower edge of the outer part for the form fit axial securing of the outer part. Reinforcement by a cage made of plastic compared with a cage made of steel reduces the weight substantially, which in turns leads to a reduction in $CO_2$ emissions in automotive engineering. Cost savings are also possible as a result of this. Furthermore, using plastic for the cage offers the advantage of more options in terms of design.

According to a preferred embodiment, the plastic cage bears at least partially against an inner wall of the outer part, wherein the contact region of the plastic cage on the inner wall of the outer part preferably constitutes more than 20% of the curved surface area of the inner wall.

Preferably, the plastic cage has at least one sealing groove, more particularly a plurality of sealing grooves arranged on an outer side of the plastic cage, which groove is opposite the inner wall of the outer part, wherein the at least one sealing groove is filled with an elastomer material. Preferably, the at least one sealing groove is filled with the elastomer material of the elastomer body which can take place in one method step during production.

According to a further preferred embodiment, the plastic cage has at least one web region, more particularly a plurality of web regions, which are lined at least in part. The lining gives the web regions increased stability. The web regions themselves serve to prevent the constriction or even closure of bearing channels during the calibration process.

Preferably, the radial stop is made of plastic. This will achieve a lower overall weight. According to a further preferred embodiment, the radial stop is configured as an upper radial stop and arranged on an upper edge of the bearing.

BRIEF DESCRIPTION OF THE DRAWINGS

Embodiments of the invention are described in greater detail below with reference to the attached drawings.

DETAILED DESCRIPTION OF THE INVENTION

Figure 1A:
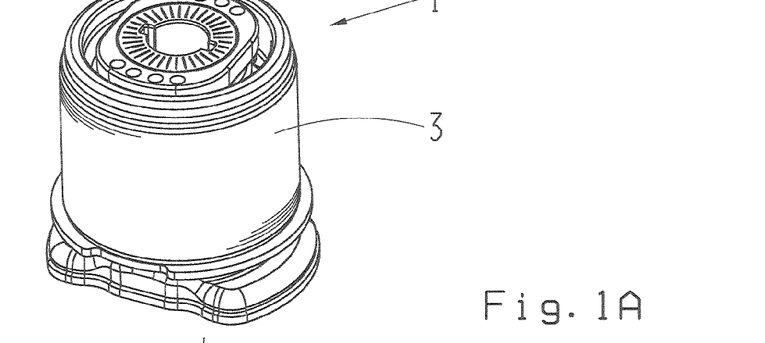
FIGS. 1A-1E show different views of a bearing according to one embodiment.
Figure 1B:
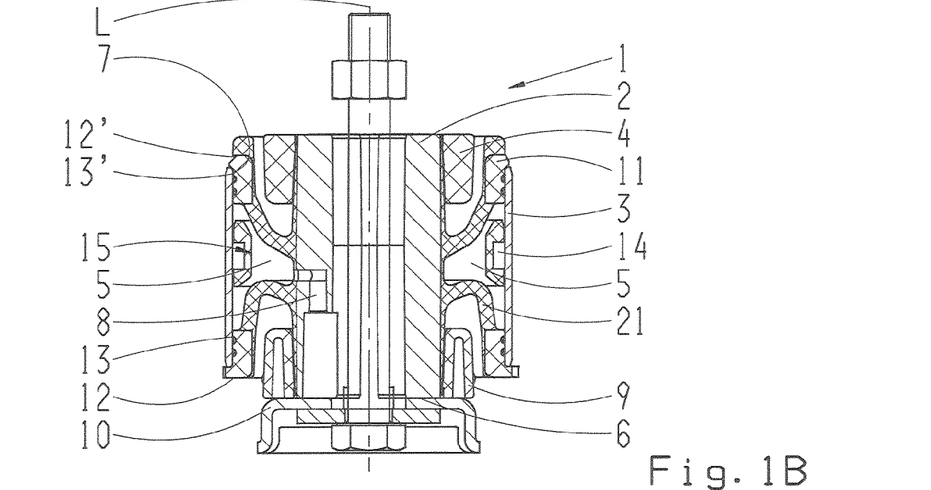
Figure 1C:
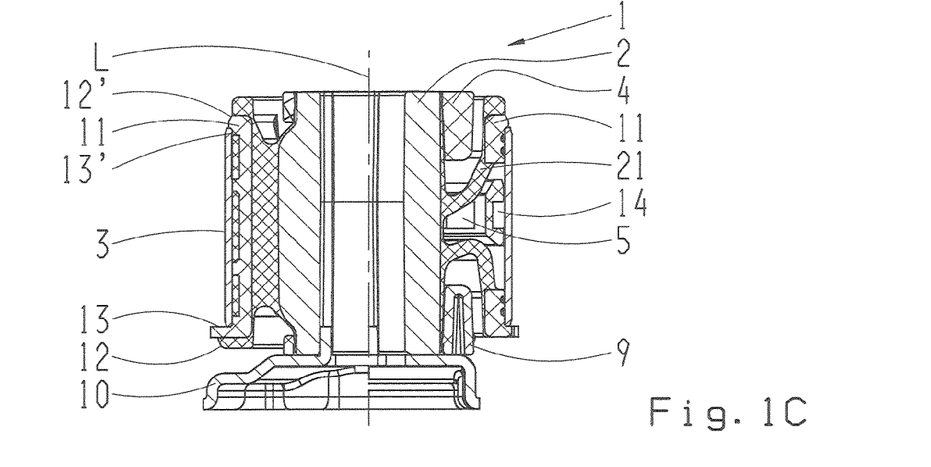
Figure 1D:
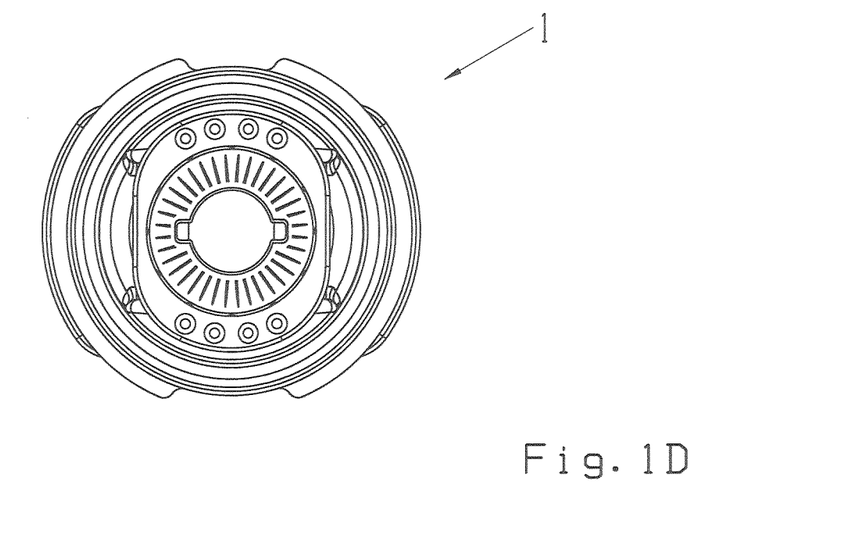
Figure 1E:
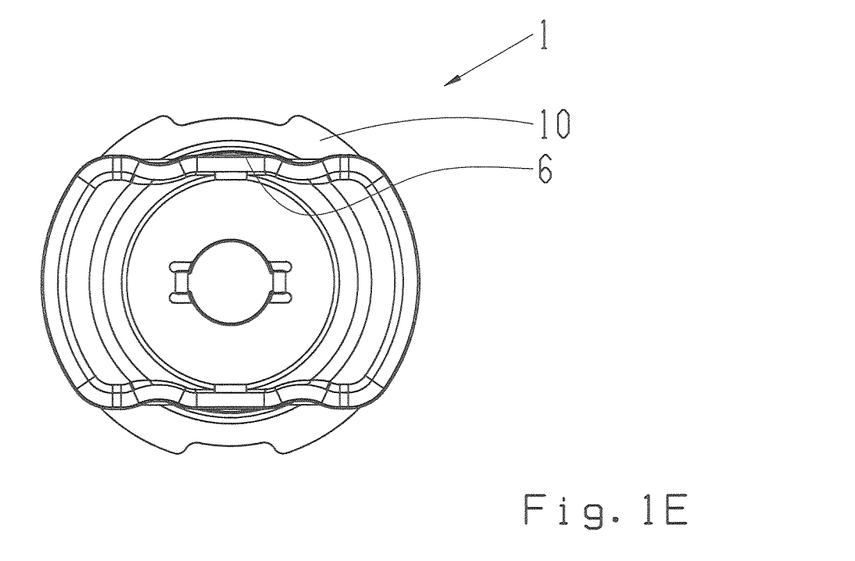

FIGS. 1A to 1E show different views of a bearing 1 configured as a hydraulic axle support bearing according to one embodiment wherein FIG. 1A represents an isometric view of the bearing 1, FIG. 1B a sectional view through the bearing 1, FIG. 1C another sectional view through the bearing rotated 90° about the longitudinal axis L, FIG. 1D a top view of the bearing 1 and FIG. 1E a view from below. As can be seen particularly from FIG. 1B, the bearing 1 has an inner part 2, a substantially hollow cylindrical outer part 3 made of aluminum and an elastomer body 21 arranged between the inner part 2 and the outer part 3. The elastomer body 21 forms balancing chambers 5 in fluid communication with each other on radially opposing sides over a radial channel 14. The right-hand balancing chamber 5 shown in FIG. 1B opens radially in the inside into a recessed filling channel 8 in the inner part 2. Furthermore, a radial stop 4 made of plastic is arranged on an upper edge of the bearing thus forming an upper radial stop. The upper radial stop is mounted on top of the inner part 2.

The elastomer body 21 is vulcanised onto the inner part 2. Moreover, a further stop is provided as lower radial stop 9 on an axial end of the inner part 2, which supports an axial stop 10, which is mounted on a front side end or on the bottom side 6 of the inner part 2. The lower radial stop 9 is also made of plastic. The axial stop is made of aluminium.

The elastomer body 21 is reinforced by a plastic cage 11, which is vulcanised into the elastomer body 21. Sections of the plastic cage 11 bear against an inner wall 7 of the outer part 3. A lower axial end 12 and an upper axial end 12' of the plastic cage 11 (see FIGS. 1B and 1C) are each formed radially outwards at 90° in order to project over a lower edge 13 and an upper edge 13' of the outer part 3 thereby axially securing the outer part 3 in a form fit manner, and consequently the outer part 3 is held securely in an axial direction relative to the plastic cage 11 and thus the elastomer body 21.

Furthermore, the plastic cage 11 has web regions 15, which can be lined in order to demonstrate increased stability. The web regions 15 prevent constriction or closure of the radial channel 14 during the calibration process.

Figure 2A:
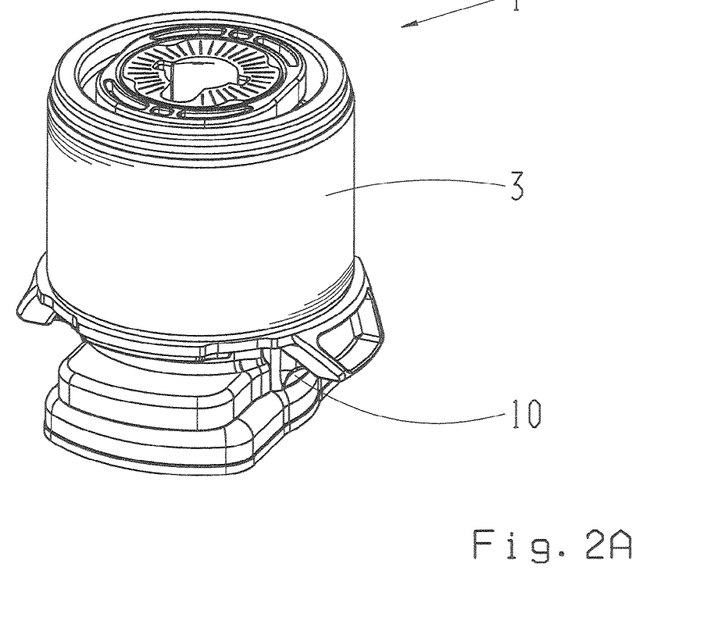
FIGS. 2A-2D show different views of a bearing according to a further embodiment.
Figure 2B:
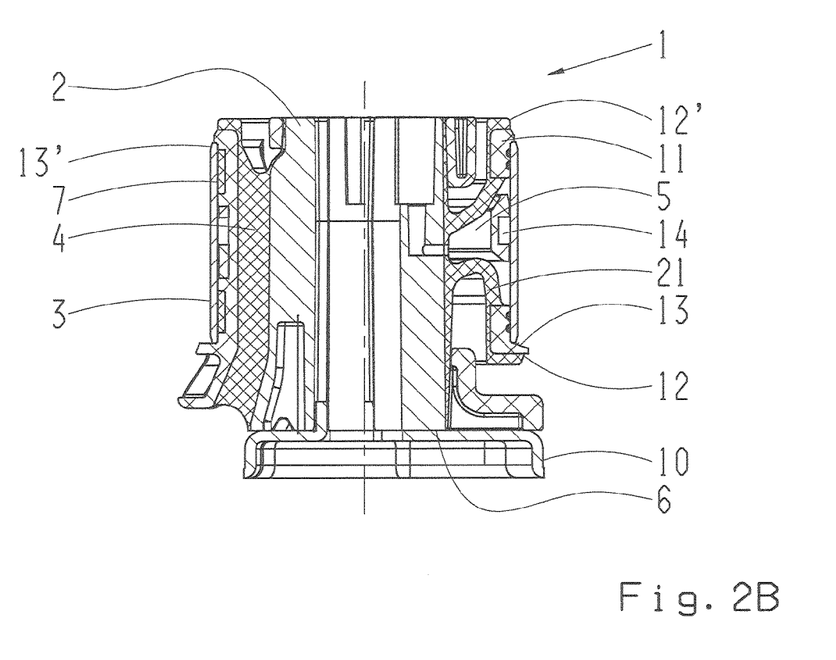
Figure 2C:
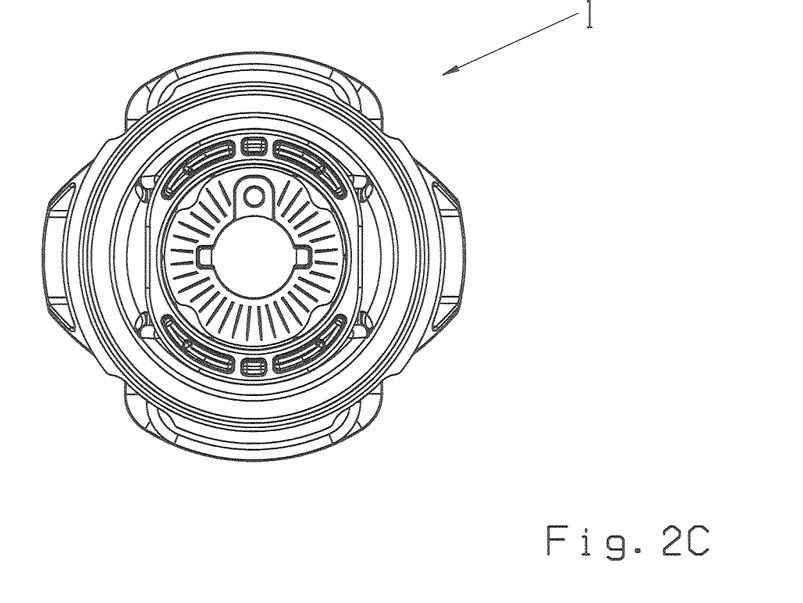
Figure 2D:
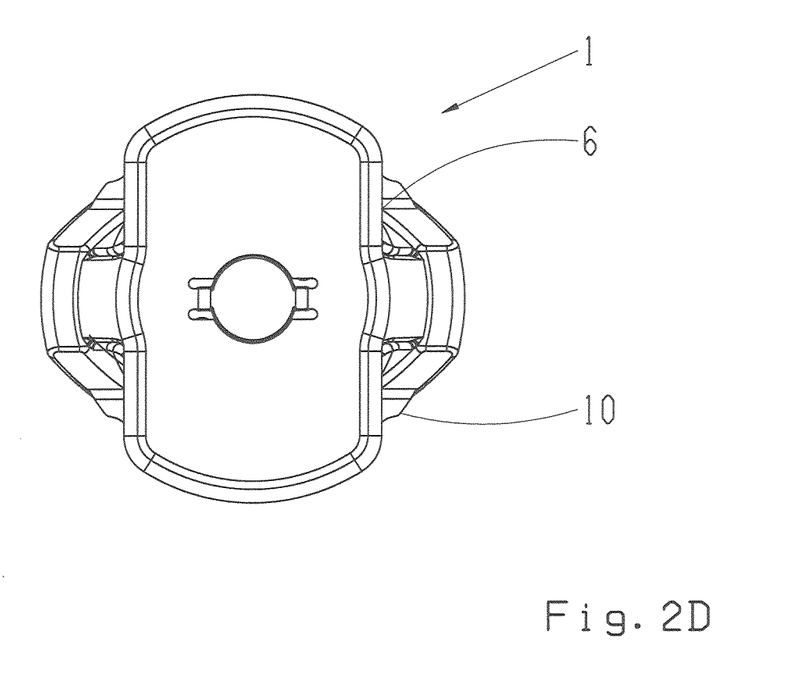

FIGS. 2A to 2D show different views of a bearing 1 configured as a hydraulic axle support bearing according to a further embodiment, wherein FIG. 2A represents an isometric view of the bearing 1, FIG. 2B a sectional view through bearing 1, FIG. 2C a top view of the bearing 1 and FIG. 2D a view of the bearing 1 from below. The design of the bearing 1 shown here essentially corresponds to the design of the bearing 1 shown in FIGS. 1A to 1E and only differs in terms of the design of the axial stop 10 on the lower end of the bearing 1.

The bearing 1, which is shown in FIGS. 2A to 2D, as well as the bearing 1, which is shown in FIGS. 1A to 1E, is produced as follows. In a preassembling step, the inner part 2, the elastomer body 21, the radial channel 14 and the outer part 3 made of aluminium are assembled loosely such that the plastic cage 11 is arranged directly on the inner wall 7 of the outer part 3. The hollow cylindrical outer part 3 is slid on from above here. The plastic cage 11 protrudes radially over the outer part 3 at both ends thereof, i.e. on the upper and lower edges 13, 13'. In this uncalibrated state, the plastic cage 11 projects over the outer part 3 only on the lower edge 13. In a subsequent calibration process, the aluminium outer part 3 is constricted, i.e. the diameter of the outer part 3 is reduced by approx. 4 mm. However, not only the diameter of the outer part 3 is reduced in the process, but also the diameter of the plastic cage 11 in the same step. Clearance of 2 mm is assured with the loose pre-assembly. The resulting constriction of the plastic cage is therefore approx. 2 mm in diameter. Thus, both the outer part 3 and the plastic cage 11 are calibrated in a single method step. After calibration, the plastic cage 11 then also projects over the outer part 3 on the upper edge 13' thereof and consequently creates the required axial securing against sliding in an upwards direction.

Figure 3A:
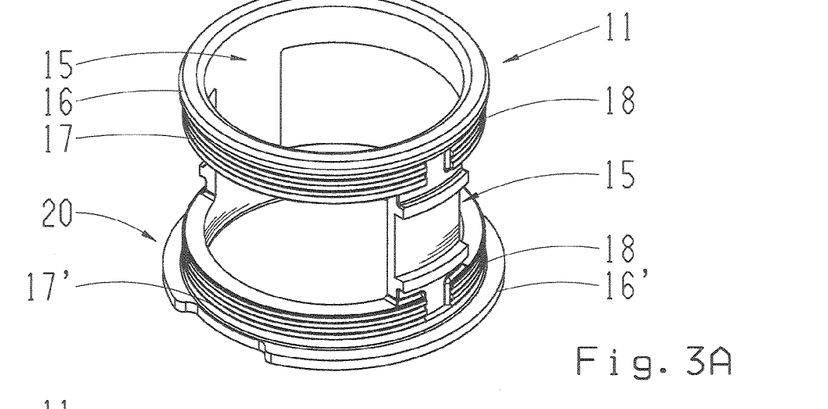
FIGS. 3A-3F show different further views of a plastic cage according to one embodiment.
Figure 3B:
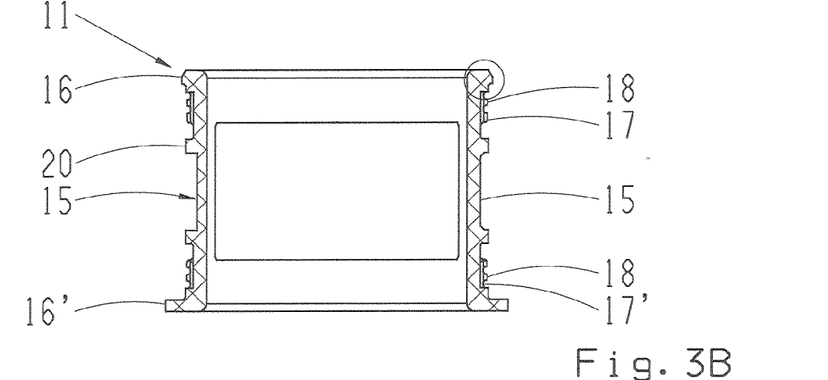
Figure 3C:
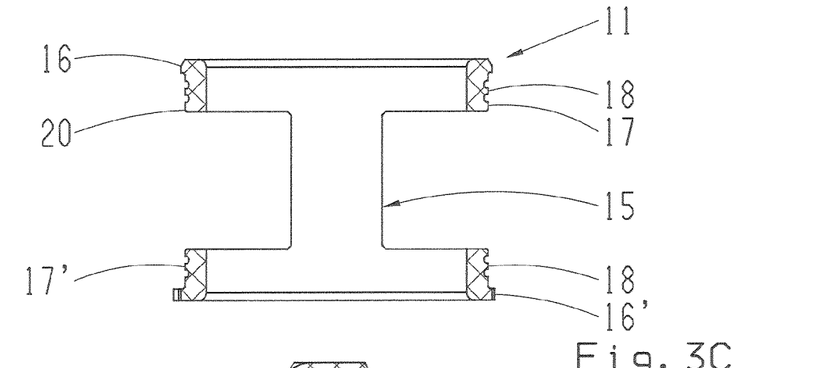
Figure 3D:
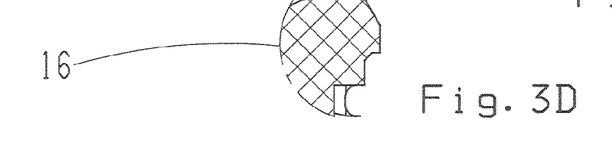
Figure 3E:
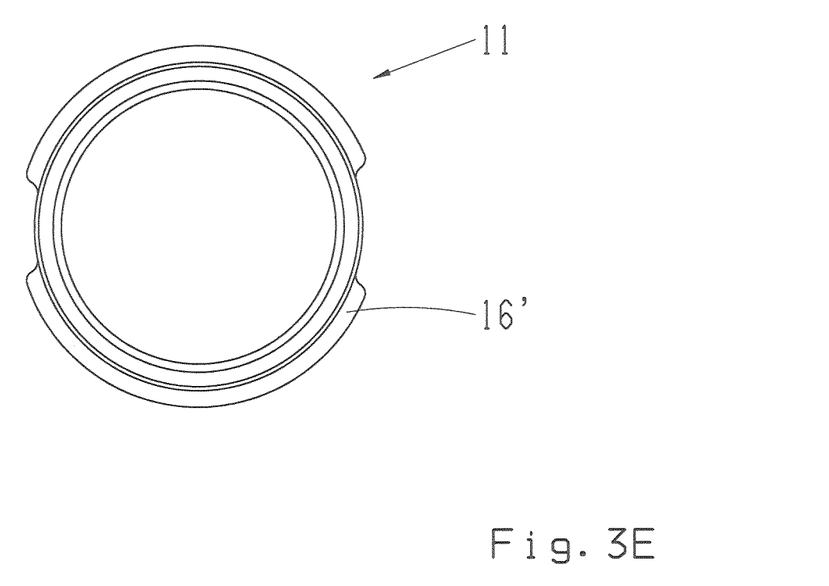
Figure 3F:
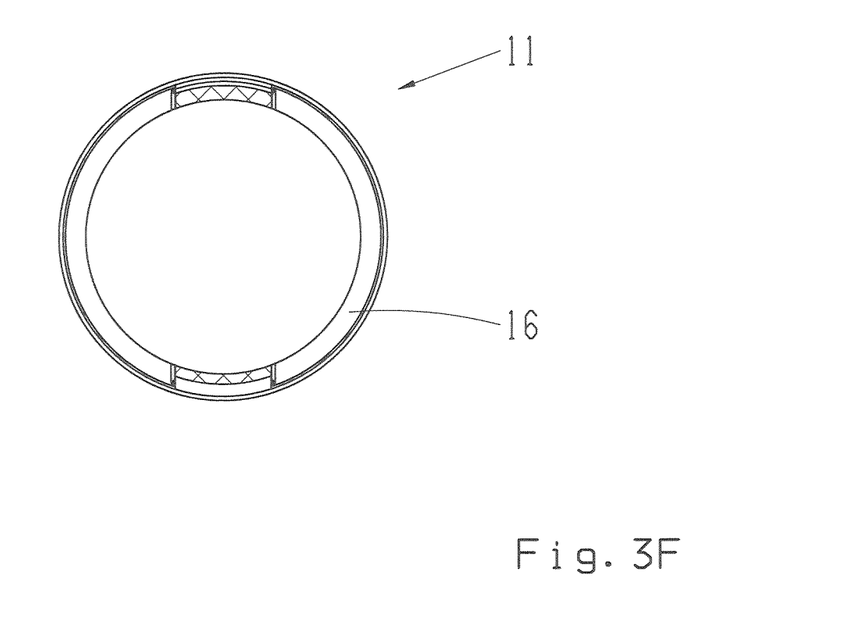

FIGS. 3A to 3F show different further views of a plastic cage 11 according to one embodiment, wherein FIG. 3A represents an isometric view of the plastic cage 11, FIG. 3B a sectional view through the plastic cage 11, FIG. 3C a further sectional view through the plastic cage 11 which, compared with the sectional view in FIG. 3B, is rotated 90° about the longitudinal axis L of the plastic cage 11, FIG. 3D a detailed view of the upper edge 16 of the plastic cage 11, FIG. 3E a view of the plastic cage 11 from below and FIG. 3F a top view of the plastic cage 11. As can be seen here, the plastic cage 11 has two of the web regions 15 described above. Furthermore, the plastic cage 11 has a plurality of sealing grooves 18 on its outer side 20 on an upper section 17 and on a lower section 17', which sealing grooves are opposite the inner wall 7 of the outer part 3 in the assembled state of the bearing 1 (see, for example, FIG. 1B). The sealing grooves 18 are filled with elastomer material during the process of spraying the elastomer body 21.

Moreover, it can be seen in the detailed view of the upper edge 16 of the plastic cage 11 shown in FIG. 3D (characterised by A in FIG. 3B), that the upper edge 16 curves outwards and is thus rounded. In contrast to this, the lower protruding edge 16' of the plastic cage 11 is not curved.

Figure 4A:
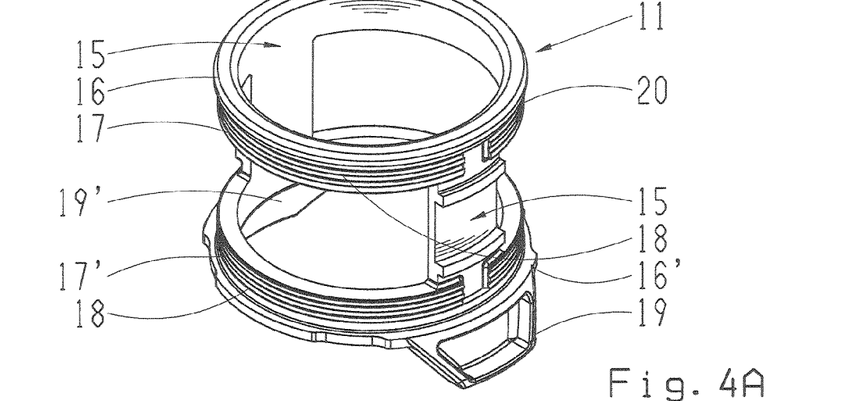
FIGS. 4A-4F show different views of a plastic cage according to a further embodiment.
Figure 4B:
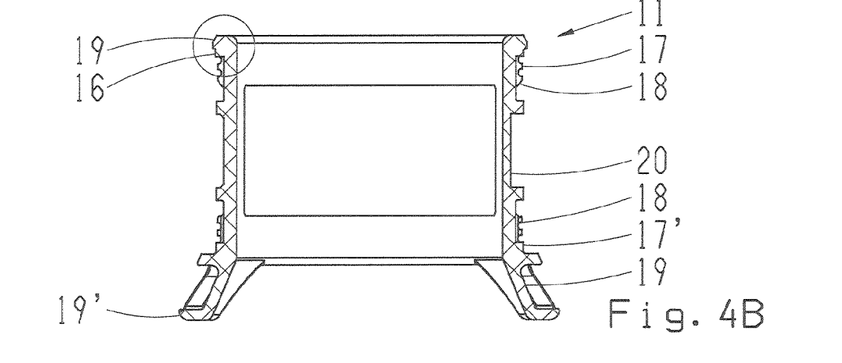
Figure 4C:
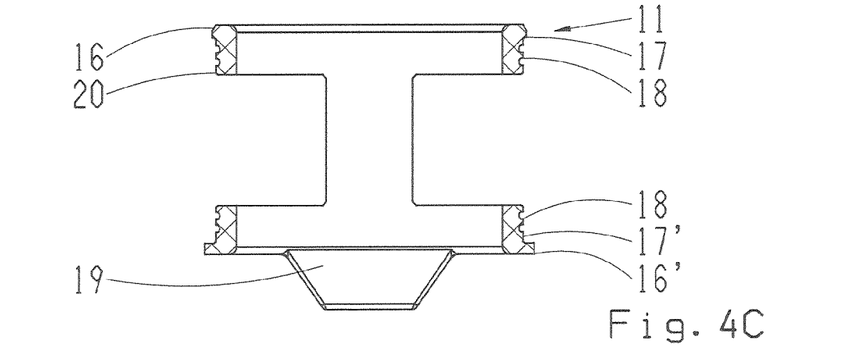
Figure 4D:
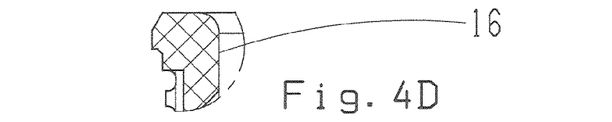
Figure 4E:
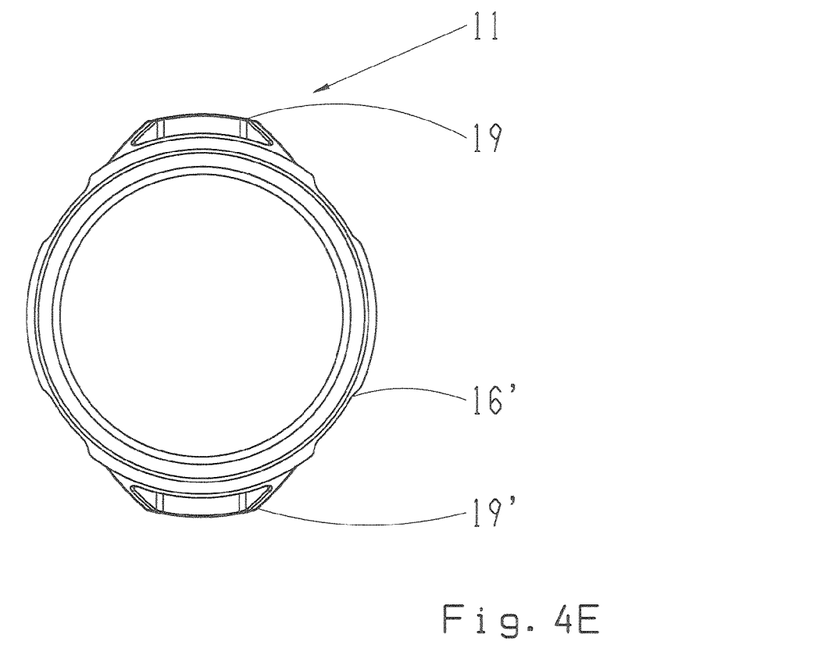
Figure 4F:
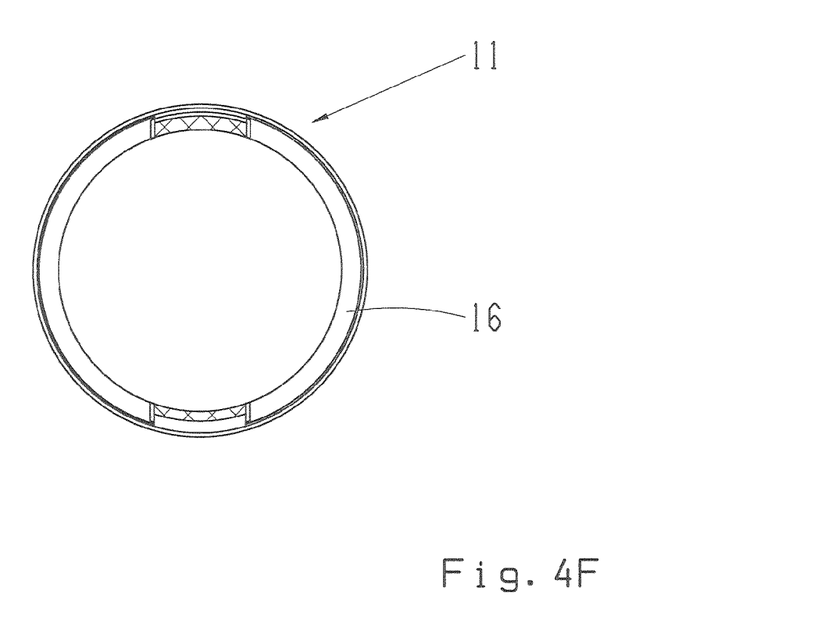

FIGS. 4A to 4F show different views of a plastic cage 11 according to a further embodiment, wherein FIG. 4A represents an isomeric view of the plastic cage 11, FIG. 4B a sectional view through the plastic cage 11, FIG. 4C a further sectional view through the plastic cage 11, which compared with the sectional view in FIG. 4B, is rotated 90° about the longitudinal axis L of the plastic cage 11, FIG. 4D a detailed view of the upper edge 16 of the plastic cage 11 (characterised by A in FIG. 4B), FIG. 4E a view of the plastic cage 11 from below and FIG. 4F a top view of the plastic cage 11. The embodiment of the plastic cage 11 shown here differs from the embodiment shown in FIGS. 3A to 3F, firstly in that the upper edge 16 of the plastic cage 11, which is shown in detail in FIG. 4D, is rounded, but not does not curve outwards, and secondly in that the lower edge 16' is provided with two conical support contours 19, 19' that point downwards and are angled slightly outwards.

REFERENCE NUMERALS

1 Bearing
2 Inner part
3 Outer part
4 Radial stop
5 Balancing chamber
6 Lower side of the inner part
7 Inner wall of the outer part
8 Filling channel
9 Lower radial stop
10 Axial stop
11 Plastic cage
12, 12' Lower and upper axial end of the plastic cage
13, 13' Lower and upper edge of the outer part
14 Radial channel
15 Web regions
16, 16' Upper and lower edge of the plastic cage
17,17' Upper and lower section of the plastic cage
18 Sealing grooves
19, 19' Conical support contours
20 Outer side of the plastic cage
21 Elastomer body

The invention claimed is:

1. A method for producing a bearing, comprising the steps of:
preassembling an inner part in an outer part with an elastomer body disposed therebetween, the elastomer body being reinforced by a plastic cage, the plastic cage at least partially bearing against an inner wall of the outer part;
wherein the plastic cage is configured to protrude radially over an upper edge and to protrude over and project beyond a lower edge of the outer part; and
simultaneously calibrating the outer part and the plastic cage by constricting the outer part and the plastic cage from a respective first diameter to a respective second diameter, wherein, after the constriction, the plastic cage projects over the upper edge of the outer part for form-fitting axial securing of the outer part;
wherein the plastic cage has at least one sealing groove arranged on an outer side of the plastic cage, the outer side of the plastic cage being opposite the inner wall of the outer part; and the at least one sealing groove is filled with an elastomer material.

2. A method in accordance with claim 1, wherein there is clearance during the pre-assembly step.

3. A method in accordance with claim 1, wherein the constricting of the outer part from the first diameter to the second diameter comprises constricting by at least 3 mm.

4. A method in accordance with claim 3, wherein the constricting of the outer part from the first diameter to the second diameter comprises constricting by approximately 4 mm.

5. A method in accordance with claim 1, wherein in the pre-assembly step, the outer part is slid onto the inner part with the elastomer body and the plastic cage from above.

6. A method in accordance with claim 1, wherein the elastomer body is connected to the plastic cage in a vulcanization step, and wherein the plastic cage is placed into a tool substantially in a form fit manner.

7. A method in accordance with claim 1, wherein the bearing is a hydraulic axle support bearing.

8. A bearing, comprising:
an inner part;
an outer part having an upper edge and a lower edge; and
an elastomer body disposed in between the inner part and outer part;
a plastic cage reinforcing the elastomer body, the plastic cage projecting over the upper edge and the lower edge of the outer part for form fit axial securing of the outer part;
wherein the plastic cage has at least one sealing groove arranged on an outer side of the plastic cage, the outer side of the plastic cage being opposite an inner wall of the outer part; and the at least one sealing groove is filled with an elastomer material.

9. A bearing in accordance with claim 8, wherein at least some areas of the plastic cage directly bear against an inner wall of the outer part.

10. A bearing in accordance with claim 9, wherein the contact region of the plastic cage against the inner wall of the outer part is more than 20% of the curved surface area of the inner wall.

11. A bearing in accordance with claim 8, wherein the at least one sealing groove comprises a plurality of sealing grooves.

12. A bearing in accordance with claim 8, wherein the plastic cage has at least one web region.

13. A bearing in accordance with claim 12, wherein the at least one web region comprises a plurality of web regions.

14. A bearing in accordance with claim 8, further comprising a radial stop made of plastic.

15. A bearing in accordance with claim 14, wherein the radial stop is configured as an upper radial stop and arranged on an upper edge of the bearing.

16. A bearing in accordance with claim 8, wherein the bearing is a hydraulic axle support bearing.

* * * * *